United States Patent [19]

Derleth et al.

[11] Patent Number: 4,683,756

[45] Date of Patent: Aug. 4, 1987

[54] LOW COST MANOMETER

[75] Inventors: James L. Derleth, Rochester; Michael A. Ciminelli, Webster, both of N.Y.

[73] Assignee: Xerox Corporation, Stamford, Conn.

[21] Appl. No.: 822,177

[22] Filed: Jan. 24, 1986

[51] Int. Cl.[4] .......................... G01L 7/18; G01L 19/14
[52] U.S. Cl. .......................................... 73/747; 73/431
[58] Field of Search ................. 73/431, 747, 748, 749, 73/750, 756

[56] References Cited

U.S. PATENT DOCUMENTS

| | | | |
|---|---|---|---|
| 2,051,539 | 8/1936 | Bandoly | 73/748 |
| 2,411,508 | 11/1946 | Dwyer | 73/747 |
| 4,380,173 | 4/1983 | Wozniak | 73/747 |
| 4,416,157 | 11/1983 | Cornelison | 73/747 |
| 4,455,876 | 6/1984 | McPherson et al. | 73/747 |
| 4,535,634 | 8/1985 | Troutman et al. | 73/747 |

*Primary Examiner*—Donald O. Woodiel

[57] ABSTRACT

A portable inexpensive manometer is realized by forming a housing assembly of two pivotable panels. The probe and a major portion of the tube are stored within the interior of the housing until the manometer is to be used. The measuring liquid is stored in a reservoir which is mounted adjacent a measuring gauge formed as an integral part of one of the panels. The reservoir is adjustable to obtain a zero reading prior to a measurement. The reservoir is exposed to the ambient during measurement by selective manipulation of a reservoir cap assembly.

5 Claims, 4 Drawing Figures

LOW COST MANOMETER

BACKGROUND OF THE INVENTION

This invention relates generally to a manometer apparatus for measuring and indicating pressure differentials and, more particularly, to a compact, inexpensive manometer having an output probe attached to one end of a flexible tube for convenient insertion into pressure-sensitive environments.

Manometers for measuring pressure differentials, liquid or air, are well known in the art. The basic components of a conventional manometer are a U-shaped tube, one end of which is open to the atmosphere and the other end open to the area where the pressure is to be measured. The tube is filled with a liquid such as water or mercury. Displacement of the liquid is measured by an associated indicator scale. The components are typically mounted on a frame member. The tube may assume a vertical or inclined orientation.

Prior art manometers have tended to be relatively costly devices. Use of materials such as glass for the U-tube; stainless steel machined parts for the frame, gauges and end caps, multiple clamping members and multiple tubing segments are all factors contributing towards this cost. Further disadvantages of prior art devices are complexity of assembly and disassembly of the component parts; maintenance of the device and difficulty in zeroing the device to pressure measurements.

The present invention is directed to a compact, inexpensive manometer having a minimum number of plastic molded parts. The manometer is easily assembled, lightweight and portable and is provided with a simple zeroing mechanism. More particularly, the invention relates to a manometer assembly for measuring air pressure variations comprising, in combination:

a housing assembly including a first panel in pivotable engagement with a second panel, said first panel having integrally formed thereon a slotted gauge member and a slideway;

a pressure measuring assembly comprising a liquid-containing reservoir slidably mounted along said slideway, a flexible tube connected at one end to said reservoir and at the other end to a probe, said tube seated in said gauge member slot; and a cap assembly secured to said reservoir, said cap assembly adjustable to establish communication with the ambient.

DESCRIPTION

Figure 1:
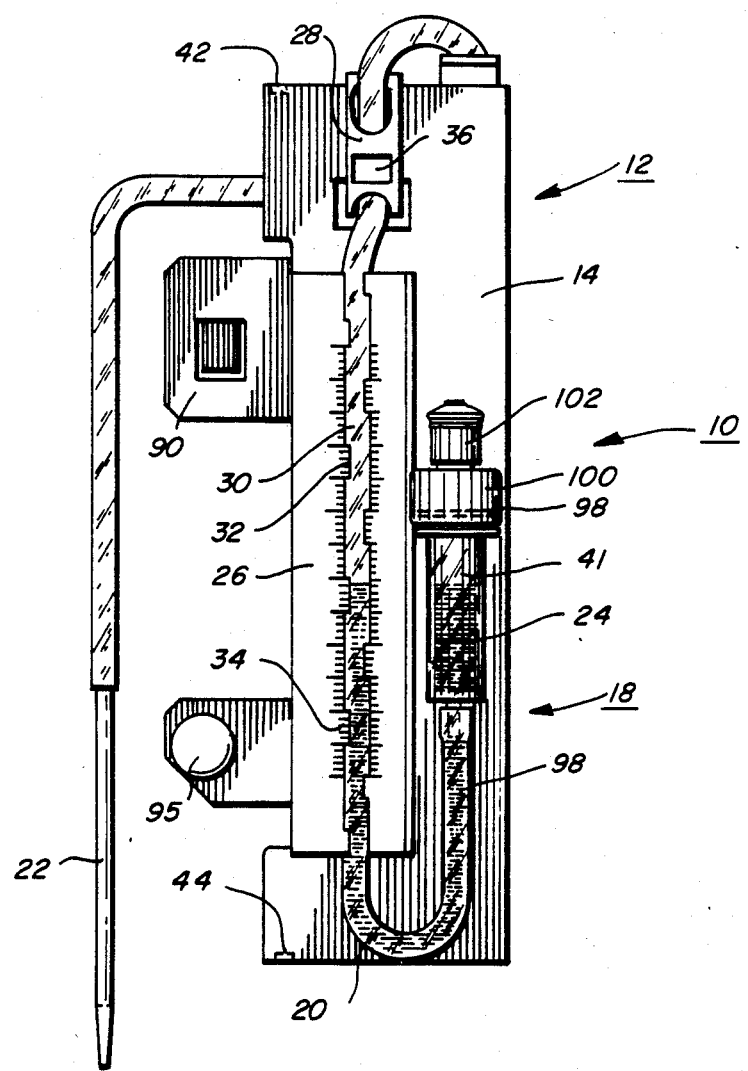
FIG. 1 is a front view of the manometer of the present invention in a closed position.
Figure 2:
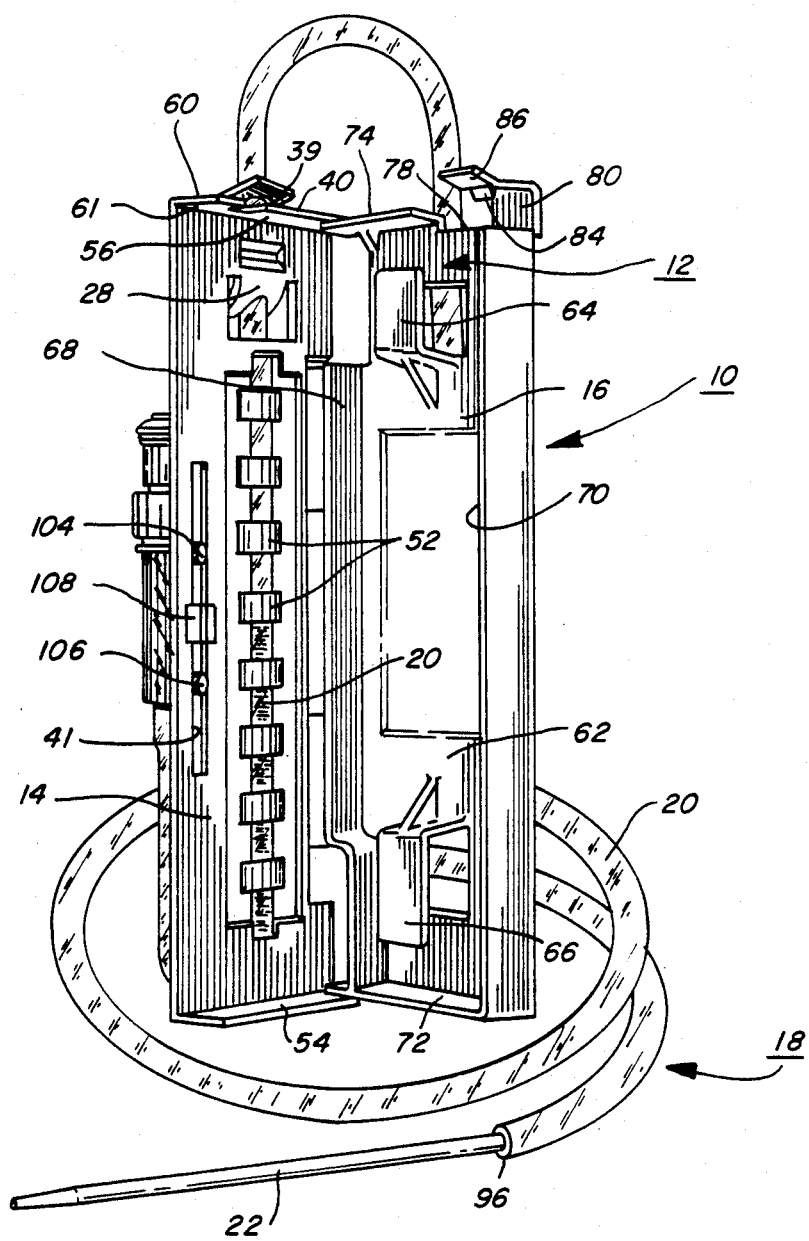
FIG. 2 is an interior view of the manometer housing.

Referring now to FIGS. 1 and 2, reference numeral 10 generally indicates a preferred embodiment of the manometer of the present invention. The manometer consists of two basic assemblies, a housing assembly 12 including a top panel 14 and a bottom panel 16 and a pressure measuring assembly 18 comprising a plastic flexible tube 20, a metal probe 22 and a reservoir assembly 24. Assemblies 12 and 18 are described in further detail below.

Figure 3:
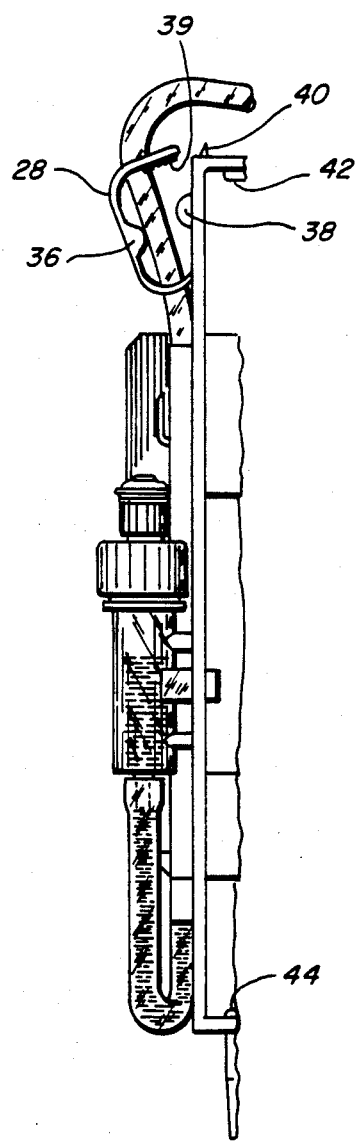
FIG. 3 is a side view of the manometer with the measuring tube and probe in a stored position.

The top surface of integrally molded panel 14 (FIG. 1) has a generally flat, rectangular surface except for a raised rectangular gauge member 26 and a tube constrictor 28. Gauge member 26 has a laterally extending slot 30 having a series of raised surfaces 32 along its edge perimeter. The width of slot 30, as modified by surfaces 32, is sufficient to snugly seat a section of tube 20. Gauge 26 has a series of vertically spaced gradations 34 with a series of easily readable numbers located at periodic intervals thereon. The numbers indicate pressure in conventional terms such as pounds per sq. inch, mm of mercury, etc. Tubing constrictor 28 is an upwardly extending, backwardly arcing segment formed integral with the surface of panel 14. Constrictor 28 has a rounded protrusion 36 (shown in side view in FIG. 3) which cooperates with a second rounded protrusion 38 on panel 14 surface to hold tubing 20 therebetween. The upper edge of constrictor 28 has a serrated lip 39 on the lower surface. This serrated lip is adapted to engage with a tab 40 on the top edge of panel 14 upon exertion of a downward pressure on the top surface of constrictor 28. This action, normally taken by an operator when the manometer is not in use, pinches the tube between the raised protrusions 36, 38 to constrict the liquid flow and prevent leakage, should the manometer be inadvertently upended.

Continuing with a description of the panel 14, a vertical slideway 41 is located parallel to laterally extending slot 30. Reservoir 24 is adapted to be moved along slideway 41 in a manner described below. The left corner edges of panel 14 have pivot pins 42, 44 therein which seat in pivot holes of panel 16 to permit panels 14 and 16 to pivot away from each other to expose the interior of the housing assembly as shown in FIG. 2.

The bottom surface of panel 14 (shown in FIG. 2) shows a bottom view of tube constrictor 28, slideway 41 and the recessed surface of gauge member 26. A vertically extending series of semi-circular loop segments 52 are formed beneath slot 30. Segments 52 serve to seat tube 20 and to prevent the tube from being inadvertently pushed into the housing interior. Panel 14 has a bottom lip 54 which, in the closed position, slides beneath the bottom edge of panel 16. The top portion of panel 14 comprises a first section 56, cutout 58 and a second section 60 having an aperture 61 which cooperates with portions of the top edge of panel 16 in a manner and for reasons described below.

Bottom panel 16, best shown in the open housing position of FIG. 2, is seen to consist of a generally flat base surface 62 having two right angle brackets 64, 66 extending upward; side walls 68, 70 and a bottom wall 72. The top portion of panel 16 consists of a sectional wall 74, biased clamp 76 separated by a cutout 78. Clamp 76 comprises a first segment 80, extending in the plane of surface 62 a second segment 82 at right angles to segment 80, a downwardly extending tab 84 and an upwardly angled segment 86 having a serrated lower surface. The height of walls 68,70,72,74 is sufficient to accommodate tube 20 and probe 22 in its coiled, stored position. The tube and probe are secured by being wound around brackets 64,66.

Continuing with a description of panel 16, the panel has pivot holes (not visible) formed in sectional wall 74 and bottom wall 72. Pivot pins 42, 44 of panel 14 are seated in the pivot holes to enable the two panels to be moved between an open or closed housing assembly position. When the panels are pivoted to a closed position, section 56 of panel 14 slides past, and seats on top of wall 74 of panel 16. The panels are secured by locating section 60 of panel 14 and clamp 76 of panel 16 such that section 60 slides beneath clamp 76, clamp 76 being provided with a slightly downwardly extending bias. Tab 84 then slides over section 60 until it becomes fixedly engaged with aperture 61. 3The panels are subsequently opened by the operator exerting an upward pressure with his thumb against the serrated surface of segment 86.

Figure 4:
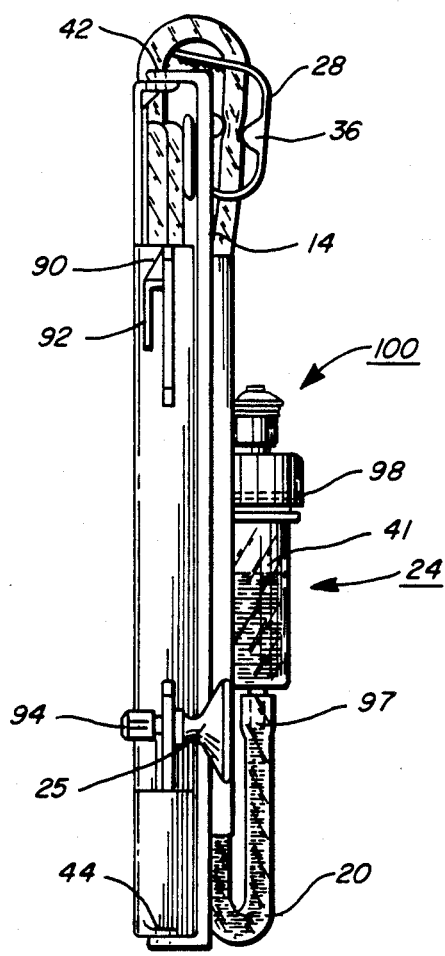
FIG. 4 is a side view of the manometer reservoir assembly.

Continuing with a description of panel 16, and referring to FIGS. 1 and 4, there is provided a mounting bracket 90 extending from the left side of the panel. Bracket 90 has a downwardly extending member 92 (FIG. 4) which is adapted to be placed over a fixed vertical support to maintain the manometer in a upright position during operation. Alternatively, the manometer may be held in a vertical position by securing thumbscrew 94 of fastener assembly 95 into an appropriate connector location.

Turning now to a more complete description of the pressure mounting assembly 18, FIG. 1 shows the measuring end of the probe is slightly tapered. The probe has an orifice which communicates with the interior of tube 20 and the pressure measuring site. The other end of tube 20 is sealed to the bottom of reservoir 24. Reservoir 24 is formed with a cylindrically shaped plastic body. The lower end has a tapered nozzle 97 over which tube 20 is secured. The other end of reservoir 24 has a threaded surface 98 to accommodate push-pull cap assembly 100. Assembly 100 has a threaded bottom section which is screwed onto threaded surface 98. The top portion of assembly 100 has an aperture upon which is seated a vertically slidable push-pull cap 102. When cap 102 is pulled upward, the reservoir is in communication with the ambient. When pushed downward, the ambient air is cut off. The reservoir interior is filled with a suitable measuring liquid which, in a preferred embodiment, is ethylene glycol with a red food color additive to enhance visibility and a detergent additive such as sodium lauryl sulfate to enhance lubricity.

Continuing with the description of the reservoir, projecting from the surface of the reservoir are circular slide members 104, 106 (FIG. 2) and rectangular slide member 108. Slide members 104, 106 are designed to slide along the interior edges of slideway 41. Slide member 108 has a flared bottom surface which slides along the bottom of slideway 41 and serves to maintain reservoir 24 in sliding contact with panel 14.

In operation, the manometer is opened by pivoting panels 14 and 16 to the open position and unwinding tube 20 and probe 22 from their coiled, stored position. The panels are then pivoted to the closed position and the manometer secured at a vertical position adjacent the workstation by bracket 90 and/or fastener 95. The manometer is then zeroed by sliding reservoir 24 along the slideway 41 so that the two menisci M1 and M2 (FIG. 1) are horizontally aligned along the gradations of gauge 26. Probe 22 is then inserted into the area where pressure is to be measured, the pressure differential being detected by the resultant displacement of liquid.

It is therefore seen that the invention provides a compact manometer consisting of basically two panels, a tube, reservoir, probe and measuring liquid. The simplicity of the design facilitates assembly, maintenance and repair of the manometer. The tube constrictor and push-pull cap assemblies ensure against inadvertent liquid spillage of the fluid from either end of the reservoir.

While the invention has been described with reference to the structure disclosed, it is not confined to the details set forth, but is intended to cover such modifications or changes as may come within the scope of the following claims.

What is claimed is:

1. A manometer assembly for measuring air pressure comprising, in combination:
   a housing assembly including a first panel in pivoting engagement with a second panel, said panels forming an enclosed chamber when in the closed position, said first panel having formed integrally thereon a slotted gauge member and a slideway; and
   a pressure measuring assembly including a reservoir slidably mounted along said slideway, said reservoir adapted to contain a fluid therein, a flexible tube connected at one end to said reservoir and at the other end to a probe, said tube seated in said gauge member slot, and a push-pull cap assembly secured to said reservoir, said cap assembly controlling communication between the reservoir interior and the ambient.

2. The manometer assembly of claim 1 further including adjustable tube-constricting means to prevent flow of liquid through a tube-constricted area.

3. The manometer assembly of claim 1 further including latching means to fix the manometer in a vertical operative position.

4. The manometer assembly of claim 1, further including means to secure said flexible tube and probe within said housing chamber when said tube and probe are not in use.

5. The manometer assembly of claim 4 wherein said securing means has a plurality of brackets contained on the interior surface of one of said panels, said tube and probe being wound around said brackets when the manometer is in a stored condition.

* * * * *